Dec. 25, 1951  B. McDUFFIE ET AL  2,580,357
APPARATUS FOR THE PREPARATION OF METAL HALIDES
Filed Jan. 26, 1944
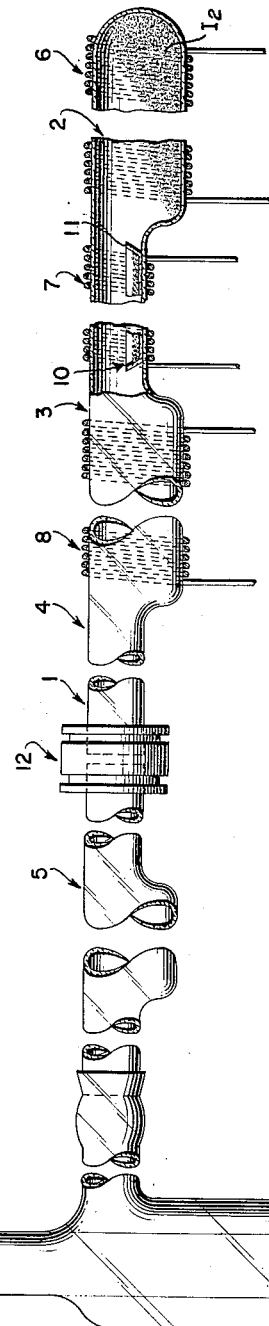
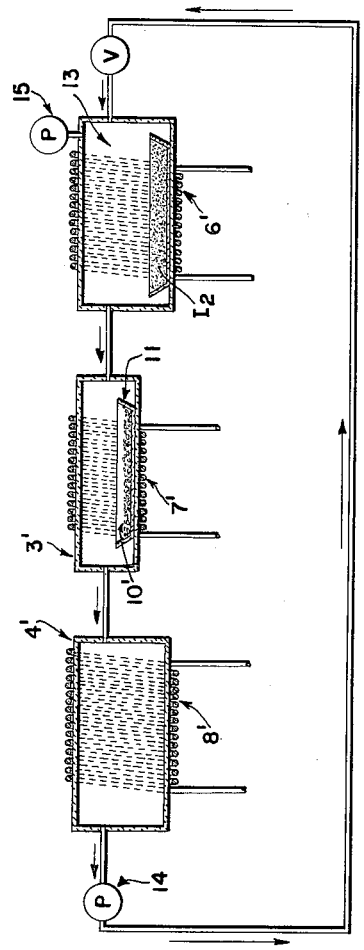
INVENTORS
BRUCE McDUFFIE
ARTHUR D. SCHELBERG
ROBERT W. THOMPSON
BY
Roland A. Anderson
ATTORNEY Patented Dec. 25, 1951

2,580,357

UNITED STATES PATENT OFFICE 2,580,357

APPARATUS FOR THE PREPARATION OF METAL HALIDES

Bruce McDuffie, Princeton, N. J., Arthur D. Schelberg, New York, N. Y., and Robert W. Thompson, Minneapolis, Minn., assignors to the United States of America as represented by the United States Atomic Energy Commission Application January 26, 1944, Serial No. 519,716

2 Claims. (Cl. 23—264)

This invention relates to an apparatus and method for the production of volatile metal halides, and more particularly such materials which are unstable in water and/or air. The invention is especially directed to the rapid manufacture of substantial quantities of volatile metal iodides that are unstable at elevated temperatures, and specifically it is directed to an apparatus and method for the production of uranium tetraiodide by contacting iodine vapor with uranium metal.

Heretofore various attempts have been made to make uranium tetraiodide, $UI_4$, such as from $U_3O_8$ by heating a mixture of $U_3O_8$ and carbon in a stream of iodine vapor, $I_2$, or by direct combination of uranium and iodine vapor, that is, U and $I_2$. However, these attempts have been either unsuccessful or have resulted in the preparation of only very small quantities of uranium tetraiodide, not suitable for other than laboratory purposes.

It is an object of this invention to prepare volatile metal halides that are relatively unstable and subject to decomposition by air and water at elevated temperatures.

It is a further object of the present invention to provide a method of producing uranium tetraiodide which is easily adaptable to the complete iodination of large quantities of uranium metal to produce, without purification by additional processes, a product which contains very little free iodine and substantially no lower iodides.

Another object of the present invention is to provide a method of manufacturing uranium tetraiodide which is adaptable for the production of large quantities of uranium tetraiodide, making it particularly suitable for industrial manufacture of this compound.

Another and still further object of the present invention is to provide a novel apparatus for carrying out the method of producing uranium tetraiodide.

Other objects and many of the attendant advantages of the present invention will be appreciated as the same becomes better understood by reference to the following detailed description when taken in connection with the accompanying sheet of drawings wherein:

Figure 1 shows an apparatus including an evacuated container or tube for producing uranium tetraiodide, and Figure 2 shows a modified form of the apparatus of our invention in which the container includes an inert atmosphere and the iodine vapor is supplied from a separate container.

This invention, in general, comprises reacting a metal and a halogen vapor in the substantial absence of air and water but in the presence of an excess of the halogen vapor and at a temperature at which the resulting metal halide exhibits an appreciable vapor pressure carrying the vaporized metal halide along with excess halogen vapor to a zone held at a temperature at which a substantial proportion of the metal halide will condense or solidify but above the temperature of condensation (or solidification) of the halogen and removing halogen vapor from said partial condensation zone.

It is an advantage of this process that large quantities of relatively unstable volatile metal halides can be prepared in high purity in a very short time. It is a further feature that by operation at the elevated temperature in the presence of an excess of the halogen, the mass action favors the formation of the metal halide; the metal halide being cooled to a temperature of greater stability before removing said excess of halogen. In addition the removal of the products from the zone of reaction induces more complete reaction and more efficient employment of the raw materials, the sweeping effect of the excess halogen materially improving the yields over a process employing diffusion. Furthermore, purification is effected simultaneously with the manufacture of the material. Better control and less hazardous operation are possible with the present apparatus than one involving a heated sealed tube.

The halogen vapor can be recycled with or without make-up halogen vapor which permits greater flexibility in the operation of the first condensation zone because loss of the metal halide is minimized. It is possible, however, to condense or solidify the halogen separately for re-use or for any other purpose. If desired, when working with a readily available halogen the vapor may be discharged, absorbed, reacted or disposed of in any suitable manner.

The reaction is one between a vapor and a non-vapor and consequently requires a surface contact between the phases. Either the metal should be in a form for maximum surface contact, such as a thin layer of metal powder with a minimum of oxide coating or film, or it should be treated in such manner as to expose new surfaces during reaction, such as by the action of an agitator on metal powder or liquid metal. In this way a relatively high interfacial area is maintained between the reacting phases, thus promoting the efficiency of reaction.

The process may be carried out by initially evacuating the system, including the reaction zone, to a very low pressure to insure the substantial absence of oxygen or water or other degenerative agencies. However, it is a feature of the invention to work in a reactant gas atmosphere or a mixed reactant gas-inert gas atmosphere either under subatmospheric, normal or superatmospheric pressure conditions. In fact it is often preferable to work under the superatmospheric pressure of an inert gas in order that any leaks will be of the reactant and inert gas outward, rather than moist air inward. In any event, air and water vapor should be removed from the reactants before initiating the reaction at a high temperature. For example, it is possible to evacuate the equipment, to fill it with the inert gas and/or reactant vapor at a temperature below the reaction temperature, to evacuate the apparatus again, and then to raise the reaction vessel to reaction temperature either while under vacuum or in the presence of said gas and/or vapor. When the desired reaction temperature is attained, the flow of reactant vapor is begun or continued (as the case may be), and the metal converted to the corresponding halide.

The invention is particularly adapted to the preparation of higher halides of metals which tend to break down to less volatile lower halides, and especially to the production of the more difficultly preparable metal iodides. It is of special merit in the production of uranium tetraiodide, either the tetraiodide of uranium of normal isotopic composition or of the individual uranium isotopes $U^{238}$, $U^{235}$, $U^{234}$, or $U^{233}$, or various mixtures thereof. At temperatures of about 520° C. the uranium tetraiodides ordinarily will break down to the less volatile uranium tri-iodides and iodine. However, the presence of an excess of iodine vapor, the joint removal of the iodine and uranium tetraiodide from the reaction zone, and the reduction of temperature to effect condensation of uranium tetraiodide in the presence of excess iodine vapor substantially prevent this decomposition.

The metal halides that may be produced by this process usually vaporize or sublime in the range of about 200° C. to 700° C. The temperature employed is preferably one at which the metal halide has a vapor pressure of at least 0.05 mm. of Hg but higher vapor pressures are advantageous.

Although the process has special value in the preparation of uranium tetraiodide, it may be employed for the preparation of tungsten tetraiodide, tellurium tetraiodide, tantalum tetraiodide, titanium tetraiodide, zirconium tetraiodide, silicon tetraiodide, beryllium diiodide, aluminum tri-iodide, gallium tri-iodide, boron tri-iodide, columbium pentaiodide, arsenic tri-iodide, germanium tetraiodide, silver iodide, cuprous iodide, cadmium diiodide, mercuric iodide, lead diiodide, stannic iodide. It is even possible to prepare other halides such as ferric chloride, tantalum pentabromide, uranium tetra- bromide or the like. Furthermore, it is within the scope of this invention to prepare higher halides of the synthetically produced element 94, plutonium, which compounds are believed to be the tetrachloride, tetrabromide, tetraiodide and hexafluoride of plutonium.

The process is adapted to batch or continuous operation as to the introduction of raw materials and/or as to removal of products. Powder or liquid metal can be introduced into the reaction zone batchwise or continuously. It is possible for the metal to pass through the halogen vapor, for example, by falling, or to remain at the floor of the reaction zone with the vapor passing thereover. A countercurrent procedure can be readily employed in a continuous process wherein the vapor comes in near the bottom and rises countercurrent to a falling stream of liquid or powdered metal. The excess halogen and volatile metal halide are removed from the top and the unreacted metal withdrawn from the bottom for further use such as recycling. The metal halide from the condensation zone can be withdrawn by suitable screw arrangements with gas seals or in the case of liquid products can be withdrawn by pumping or the like.

When operating in the presence of an inert gas, finely divided halide products are usually obtained. Suitable precipitation means may then be used to separate the metal halide product from the unreacted halogen vapor in or after the condensation zone. Cottrell precipitators may be used or, when the product is a solid, filter cloths may be employed to effect removal from the uncondensed vapor. Sirocco separators likewise can be installed for this purpose.

Referring more particularly to Figure 1, numeral 1 denotes an evacuated tube preferably made of a refractory material such as Pyrex or quartz, having a plurality of chambers 2, 3, 4 and 5. Chambers 2, 3 and 4 are heated to different temperatures by separate heating sources of any suitable construction, such as electrically heated resistance elements 6, 7 and 8, respectively. Numeral 9 denotes a trap of a well known type which can be cooled by liquid air or some other cooling medium. A quantity of coarse uranium powder 10 in the form of a thin layer is contained in a shallow Pyrex boat 11 in the middle of chamber 3. Several times the stoichiometric amount of $I_2$ is placed in chamber 2 at the end of the tube. Chamber 2 is maintained at a temperature of about 80° C. at which temperature $I_2$ sublimes or vaporizes and has a vapor pressure of about 15 mm. of Hg. Chamber 3 is maintained at a temperature of about 520° C. at which temperature the tetraiodide, $UI_4$, formed slowly undergoes sublimation, it having a vapor pressure of about 0.6 mm. of Hg at this temperature. Chamber 4 is held at about 280° C. at which temperature $I_2$ will not condense but $UI_4$ will.

In carrying out the method of the present invention substantially dry $I_2$ is introduced into chamber 2 and the boat 11 filled with coarse metallic uranium powder 10 after which the tube 1 is placed in communication with a pump (not shown) and evacuation is begun. When a vacuum corresponding to a pressure of about $10^{-4}$ mm. of Hg is obtained, chamber 4 is heated to about 280° C., chamber 3 is heated to about 520° C. and finally, chamber 2 is heated to about 80° C. The uranium powder should not be heated in a poor vacuum where no inert purging gas has been employed, since considerable surface oxidation would then occur, the oxide thus formed protecting the metal from the action of $I_2$ vapor. As the $I_2$ vapor passes through the restricted section of chamber 3 it reacts with the uranium and the uranium tetraiodide thus formed in the boat sublimes and is carried into chamber 4 by the $I_2$ stream for condensation on the wall surfaces. Since chamber 4 is maintained at a temperature sufficiently low to condense $UI_4$ but sufficiently high not to condense $I_2$, the latter flows onward to chamber 5 which is kept at a sufficiently low temperature to condense the $I_2$ almost completely. Any $I_2$ vapor not condensed in chamber 5 will be condensed and retained in trap 9.

The chambers are held at the above-mentioned temperatures until substantially all the iodine has been vaporized from chamber 2. Chamber 2 is then cooled to room temperature after which chamber 3 is cooled to room temperature, and finally chamber 4 is cooled to room temperature and dry $N_2$ admitted to the tube. By cooling chamber 4 last, there is little chance of contamination of the product by $I_2$ because this material will be condensed in prior parts of the apparatus if they are sufficiently cooled first. A vacuum tight coupling 12 is provided so that the section of the tube to the right thereof can be readily removed, quickly plugged and placed in a cabinet filled with dry $N_2$. The tube is then cracked at chamber 4 adjacent to chamber 3 because most of the uranium tetraiodide condenses in this vicinity in the form of a hollow crystalline cylinder of greatest wall thickness at the zone between the junction of chambers 3 and 4. On cooling chamber 4 the product shrinks away from the wall surfaces and the hollow cylinder of uranium tetraiodide may be removed intact. The boat 11 contains a residue of fluffy-light-brown powder; and the inner walls of chamber 3 are coated with a very thin deposit of this same color.

Figure 2 shows an apparatus very similar to Figure 1 except that the system need not be evacuated but merely filled with dry $N_2$ or other inert gas at or near atmospheric pressure thereby eliminating the necessity for high vacuum pumps, the liquid air-trap 9 and vacuum joints. The parts represented by numerals 3′, 4′, 6′, 7′, 8′ and 10′ in Figure 2 correspond in function to those denoted by numerals 3, 4, 6, 7, 8 and 10, respectively in Figure 1. Figure 2 also differs from Figure 1 in that a separate halogen source such as a tank 13 containing solid $I_2$ is provided, together with means such as pump 14 for recirculating any unreacted $I_2$ vapor. In this manner the process is adaptable to large scale manufacture of the tetraiodide suitable for industrial purposes. If desired, the system may be partially evacuated to a relatively low vacuum by pump 15 to remove oxygen and water vapor normally present, and an inert gas such as dry $N_2$, A or He introduced therein and circulated continuously by the pump 14. All parts of the system must be kept at a sufficiently high temperature so as to maintain $I_2$ in a vapor state. After accumulation of a load of $UI_4$ in chamber 4′, a fresh charge of uranium may be placed in chamber 3′ and the process continued. If desired, suitable means may be provided for continuously charging uranium metal and solid iodine to the system, and for continuously removing the product $UI_4$, thus permitting operation on a continuous basis. Where necessary, the means for removing the product may include scraping mechanism to detach solid material from the walls of the condensing chamber.

The following are quantitative results obtained from the operation of apparatus as shown in Figure 1.

| | |
|---|---|
| Weight of metal powder (containing between about 5 to 20% oxide) in boat | = 8.5 g. |
| Weight of $I_2$ initially in chamber 2 | = 97.6 g. |
| Weight of $I_2$ recovered (from trap 9) | = ~80.1 g. |
| Weight of $I_2$ which reacted | = ~17.5 g. |
| Stoichiometric amount of $I_2$ for 8.5 g. U | = 18.2 g. |
| Yield of $UI_4$ | = 19.4 g. |
| Theoretical yield of $UI_4$ (based on U) | = 26.8 g. |
| Percent yield | = 73% |
| Weight of residue left in boat | = 1.4 g. |
| Time required to empty $I_2$ chamber 2 | = ~4 hrs. (at ~80° C). |

The product upon being analyzed by standard methods of analysis was found to contain an average of 32.3% uranium and 67.43% iodine thus indicating that the product was substantially pure uranium tetraiodide. Pure uranium tetraiodide has a uranium content of 31.9% U and 68.1% I.

In another preparation larger quantities of materials were involved. The boat was filled with 62.3 g. of uranium powder and the yield of $UI_4$ was 80.7 g. The low yield was due to the fact that the layer of powder in the boat was too deep for $I_2$ vapor to diffuse through. The residue in the boat weighed 62.9 g. and consisted of three more or less distinct layers. The top layer was a brown powder similar to that found completely filling the boat in the first preparation. The middle layer was a black, solid mass showing crystalline structure and containing considerable $UI_4$ which could not readily diffuse through the layer of powder above it. The bottom layer was unreacted metal powder which was protected from $I_2$ vapor by the layers above. The time required to empty the $I_2$ bulb was 9 hours at 75° C. From these results it appears that layers of powder thicker than about 0.4 cm. are preferably avoided if the reaction is to take place in a reasonable length of time. If the $I_2$ vapor and uranium are brought into better contact by using thin layers of powder or by filling the restricted section of chamber 3 (Figure 1) completely with small lumps of metal, the $I_2$ stream can be increased and the time required for the preparation reduced.

While we have described the above embodiments of our invention, it is clear that changes may be made therein without departing from the spirit and scope of the invention as defined in the appended claims.

We claim:

1. An apparatus for facilitating a chemical reaction between an easily vaporizable solid and a substantially non-volatile solid to form a reaction product of intermediate volatility which comprises at least four intercommunicating chambers, the first of said chambers being provided with an individual heating unit capable of causing the easily vaporizable solid to vaporize, the second of said chambers being provided with a container for holding the substantially non-volatile solid and with an individual heating unit for causing the vapors from the first chamber to react with the non-volatile solid in said second chamber, the third of said chambers being provided with an individual heating unit capable of maintaining a temperature therein at which the reaction product of intermediate volatility condenses while the easily vaporizable solid is maintained in a gaseous state, the fourth of said chambers being provided with surfaces on which the easily vaporizable solid condenses, and a liquid air trap communicating with said fourth chamber for condensing and trapping any vapor escaping from said fourth chamber.

2. An apparatus for facilitating a chemical reaction between an easily vaporizable solid and a substantially non-volatile solid to form a reaction product of intermediate volatility which comprises at least four intercommunicating chambers, the first of said chambers being provided with an individual heating unit capable of causing the easily vaporizable solid to vaporize, the second of said chambers being provided with a container for holding the substantially non-volatile solid and with an individual heating unit for causing the vapors from the first chamber to react with the non-volatile solid in said second chamber, the third of said chambers being provided with an individual heating unit capable of maintaining a temperature therein at which the reaction product of intermediate volatility condenses while the easily vaporizable solid is maintained in a gaseous state, the fourth of said chambers being provided with surfaces on which the easily vaporizable solid condenses, and a vacuum pump for at least partially evacuating said apparatus prior to the initiation of a reaction therein.

BRUCE McDUFFIE.
ARTHUR D. SCHELBERG.
ROBERT W. THOMPSON.

REFERENCES CITED

The following references are of record in the file of this patent:

UNITED STATES PATENTS

| Number | Name | Date |
|---|---|---|
| 1,304,572 | Kluekansky | May 27, 1919 |
| 1,321,133 | Sleeper | Nov. 11, 1919 |
| 1,329,457 | Carter | Feb. 3, 1920 |
| 1,445,870 | Cole | Feb. 20, 1923 |
| 1,830,696 | Gelissen | Nov. 3, 1931 |
| 1,888,996 | McInerny et al. | Nov. 29, 1932 |
| 1,984,480 | Henne | Dec. 18, 1934 |
| 2,020,431 | Osborne et al. | Nov. 12, 1935 |
| 2,067,019 | Reigler | Jan. 5, 1937 |
| 2,150,366 | Ehrhart | Mar. 4, 1939 |
| 2,169,261 | Lee et al. | Aug. 15, 1939 |
| 2,277,220 | Gailey | Mar. 24, 1942 |
| 2,385,505 | Grimble | Sept. 25, 1945 |
| 2,393,674 | Zaikowsky | Jan. 29, 1946 |

FOREIGN PATENTS

| Number | Country | Date |
|---|---|---|
| 521,975 | Great Britain | June 5, 1940 |

OTHER REFERENCES

Comprehensive Treatise on Inorganic and Theoretical Chemistry, vol. XII, page 93, 1932.

"Physical Review," vol. 57, pages 1185–6.

Guichard, Sur un nouveau composé de l'uranium, le tetraiodure, Comptes Rendus, vol. 145, page 921 (1907).